(12) United States Patent
Kramer

(10) Patent No.: US 6,832,433 B2
(45) Date of Patent: Dec. 21, 2004

(54) MACHINING APPARATUS AND METHOD OF USING SAME

(75) Inventor: Rodney M. Kramer, Rockford, IL (US)

(73) Assignee: Rockford Products Corporation, Rockford, IL (US)

( * ) Notice: Subject to any disclaimer, the term of this patent is extended or adjusted under 35 U.S.C. 154(b) by 96 days.

(21) Appl. No.: 10/378,304

(22) Filed: Mar. 3, 2003

(65) Prior Publication Data

US 2004/0172799 A1 Sep. 9, 2004

(51) Int. Cl.⁷ .............................. B23P 13/02; B23C 1/14; B23Q 3/06; B23B 31/103; B23B 31/10
(52) U.S. Cl. ......................... 29/558; 29/27 A; 29/564; 29/563; 29/51; 409/233; 409/165; 408/239 A; 279/50; 279/43.4; 279/46.3
(58) Field of Search ......................... 29/38 A, 557–558, 29/27 R, 27 C, 564, 563, 27 A, 50–52; 409/232–233, 165, 132; 408/239 R, 239 A; 279/43.4, 46.3, 43.2, 43.1, 43, 46.2, 50–51

(56) References Cited

U.S. PATENT DOCUMENTS

| | | |
|---|---|---|
| 3,781,974 A | 1/1974 | Hölzl et al. |
| 3,793,707 A | 2/1974 | Foll et al. |
| 3,825,245 A | 7/1974 | Osburn et al. |
| 3,979,985 A | 9/1976 | Daniels |
| 3,997,177 A * | 12/1976 | Buzzi ............................ 279/50 |
| 4,090,287 A | 5/1978 | Selander |
| 4,185,376 A | 1/1980 | Johnstone |
| 4,301,581 A | 11/1981 | Bader et al. |
| 4,302,144 A | 11/1981 | Hallqvist |
| 4,355,938 A | 10/1982 | Page |
| 4,655,652 A | 4/1987 | Schissler |
| 4,987,765 A | 1/1991 | Nishimura et al. |
| 4,996,762 A | 3/1991 | Takayama |
| 5,036,582 A | 8/1991 | Usui |
| 5,062,195 A | 11/1991 | Binder |
| 5,361,485 A | 11/1994 | Baudermann |
| 5,439,431 A * | 8/1995 | Hessbruggen et al. ...... 29/27 C |
| 5,480,164 A * | 1/1996 | Murphy ........................ 279/50 |
| 6,257,595 B1 * | 7/2001 | Difasi et al. .................. 279/50 |
| 6,533,292 B2 * | 3/2003 | Fant ............................. 279/50 |
| 2001/0028150 A1 * | 10/2001 | Fant ............................. 279/50 |

* cited by examiner

Primary Examiner—Erica Cadugan
(74) Attorney, Agent, or Firm—McDermott Will & Emery LLP

(57) ABSTRACT

The present invention comprises a machining apparatus including a work piece holder having an adapter body with an axial bore and a translating portion located within the axial bore of the adapter body. The translating portion has a proximal end for coupling with a retention knob collet of a spindle and a distal end for attaching to a collet. The work piece holder includes a retaining piece coupling the adapter body and the translating portion allowing the translating portion to move axially within the adapter body. The apparatus facilitates a rotating spindle grasping and rotating a work piece to be brought into contact with a processing tool held stationary on a work table. The present invention also includes a fixture block for attaching milling tools and other devices to a work table and a method of operating a milling machine utilizing the fixture block and work piece holder.

24 Claims, 10 Drawing Sheets

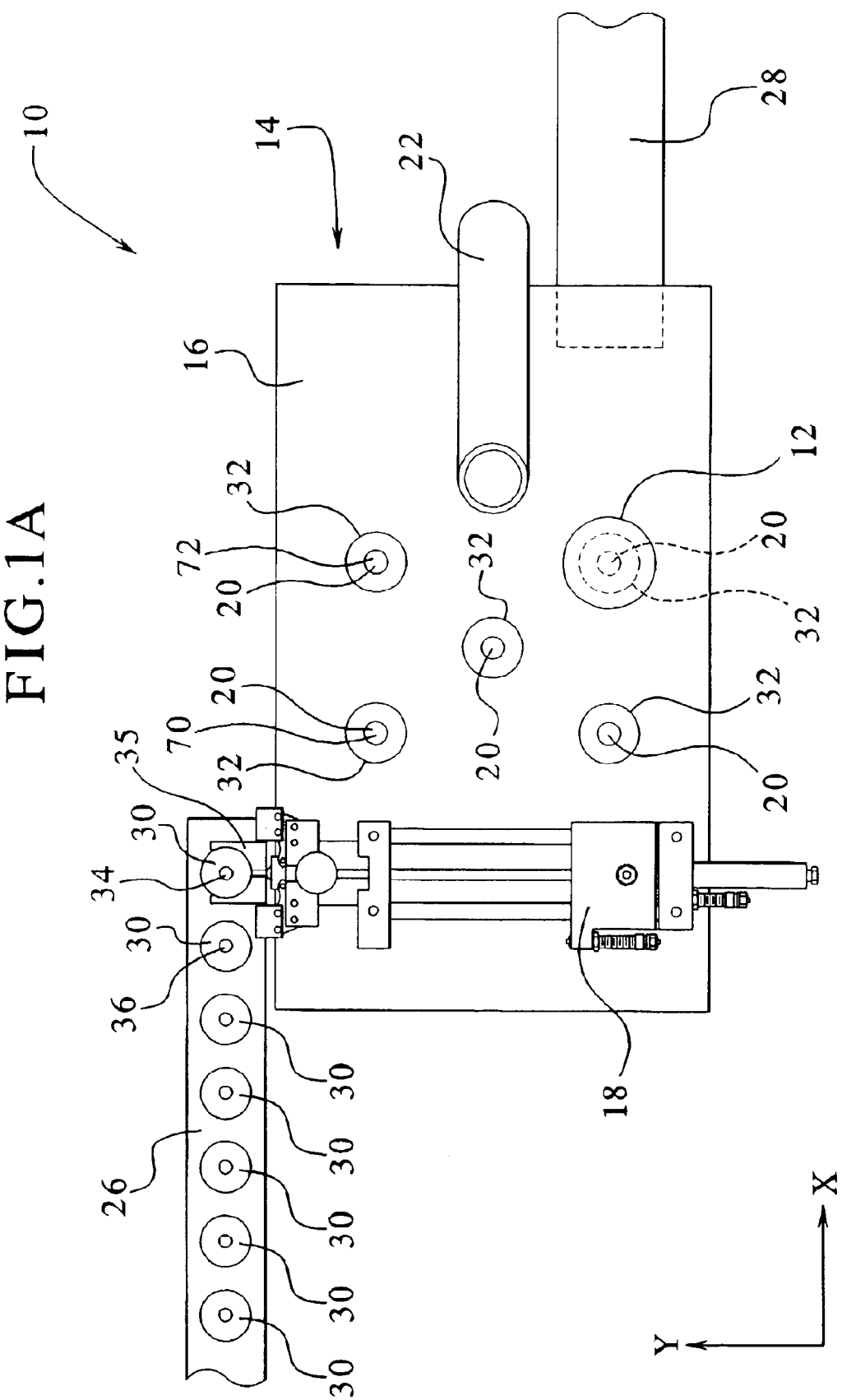

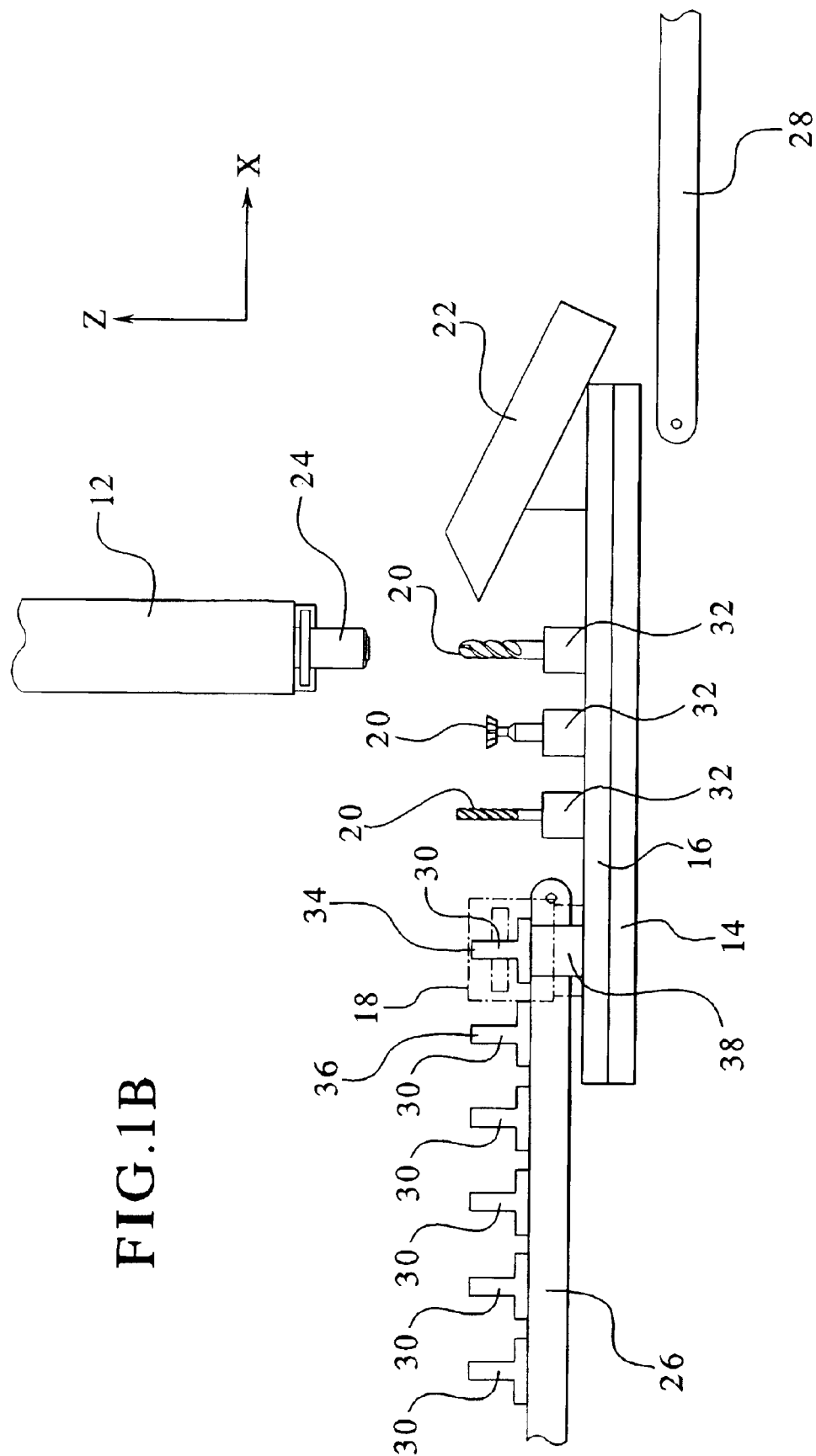

US 6,832,433 B2

MACHINING APPARATUS AND METHOD OF USING SAME

FIELD OF THE INVENTION

The present invention relates to machining equipment. Specifically, the present invention provides a machining apparatus and a method of using the same. The machining apparatus of the present invention includes a work piece holder for attaching a work piece to a machine tool spindle.

BACKGROUND OF THE INVENTION

Milled work pieces were typically manufactured using a milling machine having a rotating spindle and a machine table. Unfinished work pieces were loaded onto the machine table, either manually or automatically using a robot. The work pieces were held stationary on the machine table using a holding mechanism. A cutting tool was loaded into the rotating spindle and was brought into contact with the work piece via movements of the machine table and the spindle. If more than one tool was required to finish the work piece, the first tool would need to be removed from the spindle and the second tool loaded into the spindle. Such tool changes were time consuming. An average tool change took approximately six seconds. Naturally, the production time wasted on tool changes correlated directly with the number of tools required to machine a particular work piece. Therefore, the greater number of tools required to complete a particular work piece, the more production time was wasted on tool changes.

SUMMARY OF THE INVENTION

The present invention provides a machining apparatus and a method of using the same. The apparatus of the present invention includes a work piece holder that utilizes the drawbar action of a spindle to actuate a collet for grasping and releasing a work piece. The apparatus of the present invention may further include a fixture block mounted to a machine table for holding tools to process a work piece and a work piece transfer device for transferring work pieces from an incoming conveyor to the machine table. The method of the present invention includes mounting tools to a fixture block, mounting an unprocessed work piece within the work piece holder attached to the spindle and processing the work piece.

It is an advantage of the present invention to provide a work piece holder for mounting a work piece on a spindle.

It is another advantage of the present invention to provide a work piece holder that uses a mechanical drawbar to actuate a collet for grasping and releasing a work piece.

It is a further advantage of the present invention to provide a method of finishing a work piece using a work piece holder to hold the work piece in the spindle.

It is, moreover, an advantage of the present invention to provide a method of finishing a work piece wherein tools are held in place on a work table and the work piece is moved to each of the tools via the axis movements of the machine.

It is yet another advantage of the present invention to utilize production time of a milling machine more efficiently by eliminating wasted time devoted to tool changes.

It is another advantage of the present invention to provide a machine and method of machining for automating work piece handling throughout a milling or other processing operation.

It is still further an advantage of the present invention to eliminate spindle time devoted to tool changes.

Additional features and advantages of the present invention are described in, and will be apparent from, the detailed description of the presently preferred embodiments and from the drawings.

BRIEF DESCRIPTION OF THE DRAWINGS

FIG. 1A is a top plan view of a milling machine of the present invention, wherein a work piece transfer device is grasping a work piece from an incoming conveyor.

FIG. 1B is a side view of the milling machine shown in FIG. 1A.

DETAILED DESCRIPTION OF THE PREFERRED EMBODIMENTS

Figure 2:
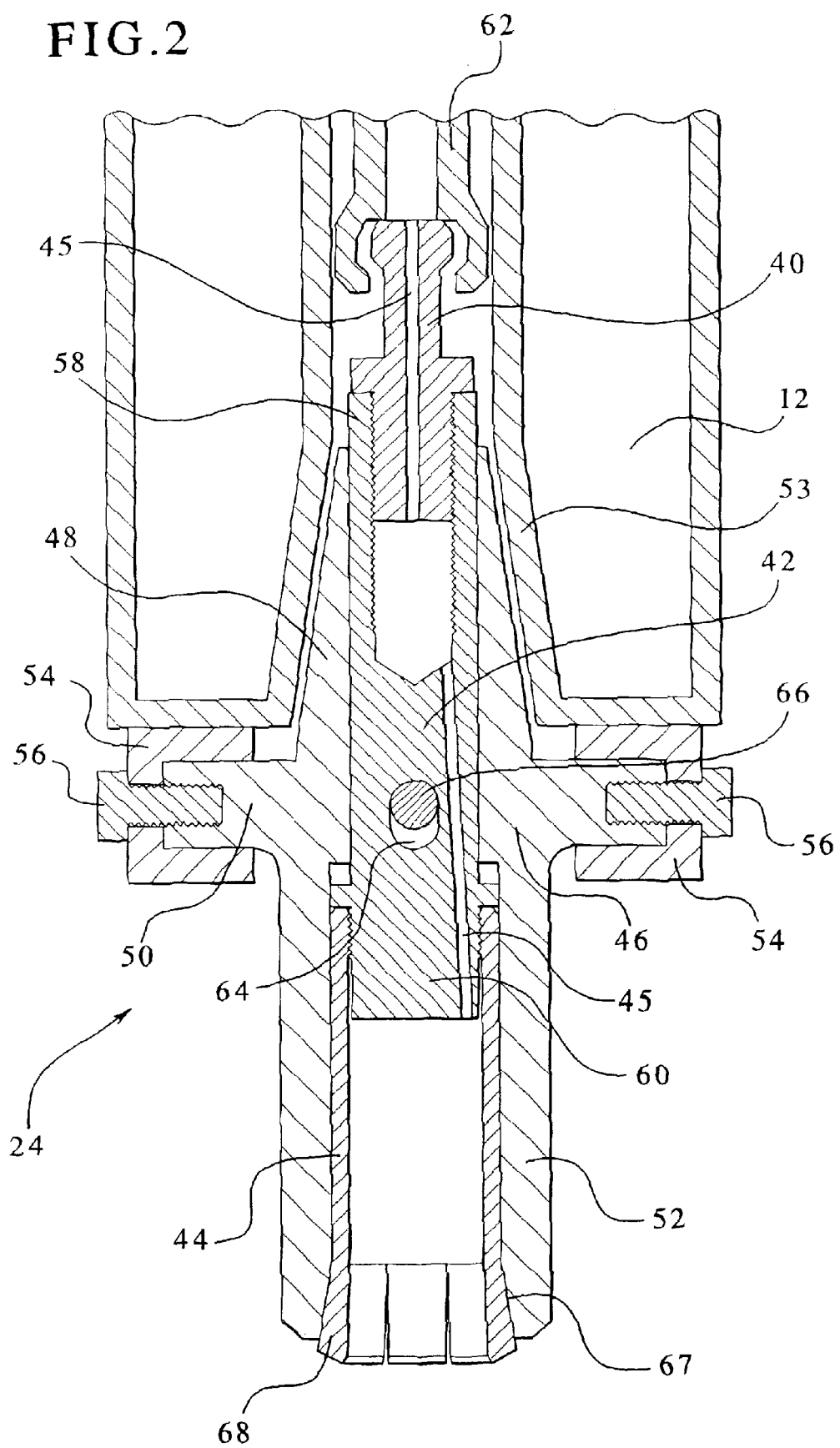
FIG. 2 is a cross-sectional view of a work piece holder of the present invention.

FIGS. 1A and 1B illustrate an example of a milling machine 10 of the preferred embodiment of the present invention. The milling machine 10 shown in FIGS. 1A and 1B is a vertical milling machine, however, it is contemplated that devices and methods of the present invention are applicable to other types of milling machines and other work piece processing devices that utilize a spindle. For example, as will be apparent to one skilled in the art, the present invention is applicable to horizontal milling machines and methods of using the same. Additionally, the devices and methods of the present invention are applicable to multi-spindle machines, mills, drills, etc.

As shown in FIGS. 1A and 1B, the milling machine 10 of the preferred embodiment includes a spindle 12 and a machine table 14. A fixture block 16 is secured to the machine table 14 and provides a mounting surface for a work piece transfer device 18, machining tools 20, and an exit tube 22. Additionally, an incoming conveyor 26 and an outgoing conveyor 28 are shown in FIGS. 1A and 1B. Further, FIG. 1B shows a work piece holder 24 attached to the spindle 12.

During the operation of the milling machine 10, the machine table 14 feeds independently of the spindle 12 along the x and y axes shown in FIG. 1A such that the spindle 12 may be located over any portion of the machine table 14. Similarly, the spindle 12 feeds independently of the machine table 14 along the z axis such that the spindle may be located at various heights, on or above the machine table 14. Moreover, the machining tools 20, the work piece transfer device 18, and the exit tube 26 move in unison with the machine table 14 along the x and y axes.

Figure 3:
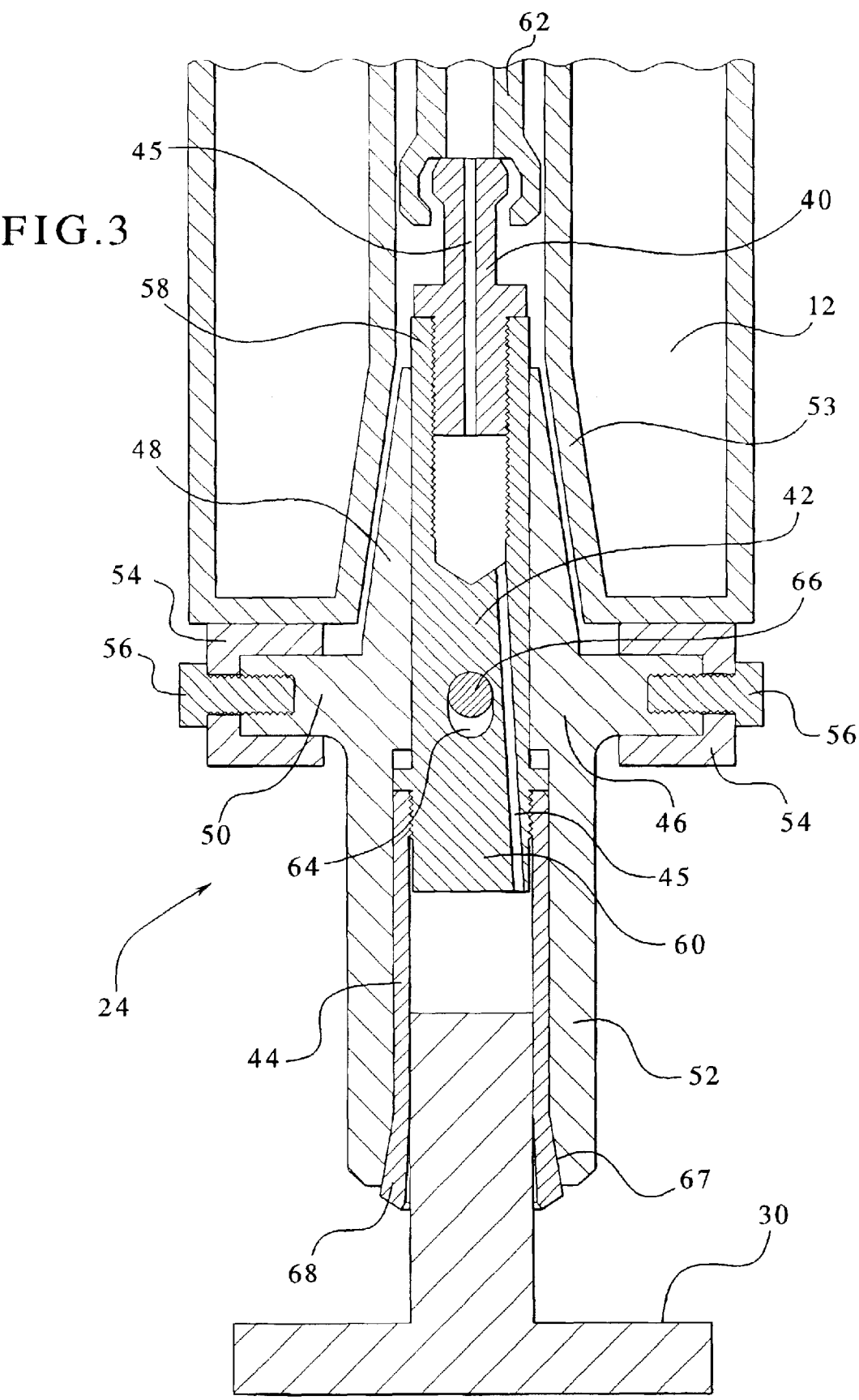
FIG. 3 is a cross-sectional view of the work piece holder shown in FIG. 2, wherein the work piece holder is surrounding a work piece.

FIG. 2 illustrates one embodiment of the work piece holder 24 of the present invention. As shown in FIG. 2, the work piece holder 24 includes a retention knob 40, a draw tube 42, a collet 44, and an adapter body 46. The adapter body 46 has a spindle taper portion 48, a clamping portion 50 and a collet housing portion 52 forming an axial bore along the length of the adapter body 46. The spindle taper portion 48 is designed to be inserted into a tapered portion 53 of the spindle 12. The clamping portion 50 of the work piece holder 24 is designed to be affixed to the spindle 12 via a pair of spindle clamps 54 and a pair of spindle keys 56, as shown in FIG. 2. The spindle keys 56 prevent the work piece holder 24 from rotating within the spindle 12. The clamping portion 50 is depicted in FIGS. 2–3 as an annular boss; however, the clamping portion 50 may be otherwise formed to enable the work piece holder 24 to be affixed to the spindle 12 via the spindle clamps 54 and the spindle keys 56. Alternatively, the work piece holder 24 may be bolted or welded to the spindle 12, formed as an integral part of the spindle 12 or otherwise secured to the spindle to enable the spindle to rotate the work piece 30 held by the work piece holder 30. For example, bolt holes may be drilled through the work piece holder 24 to enable the work piece holder 24 to be bolted to the face of the spindle 12.

As shown in FIG. 2, the retention knob 40 screws into a proximal end 58 of the draw tube 42 and the collet 44 screws onto a distal end 60 of the draw tube 42. When assembled, the retention knob 40 and the draw tube 42 form a translating portion of the work piece holder 24. The translating portion has a distal end for attaching to the collet 44 and a proximal end for engaging a retention knob collet 62, as described below. In the embodiment of the work piece holder 24 shown in FIG. 2, the collet 44 forms a work piece engaging portion. The translating portion and work piece engaging portion shown in FIG. 4 move within the adapter body 46 as a single piece. In an alternative embodiment (not depicted), any two or three of the retention knob 40, the draw tube 42, and the collet 44 may be formed from a unitary, one-piece construction. Similarly, the retention knob 40, the draw tube 42, and the collet 44 may be further broken out into a greater number of pieces without departing from the scope or the objectives of the present invention.

The translating portion shown in FIG. 2 further includes a vent hole 45 extending from the top surface of the retention knob 40 through the lower surface of the draw tube 42. The vent hole 45 allows pressurized air from the spindle 12 to pass through the translating portion into the internal diameter of the collet 44. The vent hole 45 may be formed as a single passageway as shown in FIGS. 2–3 or from multiple holes or channels.

Figure 4:
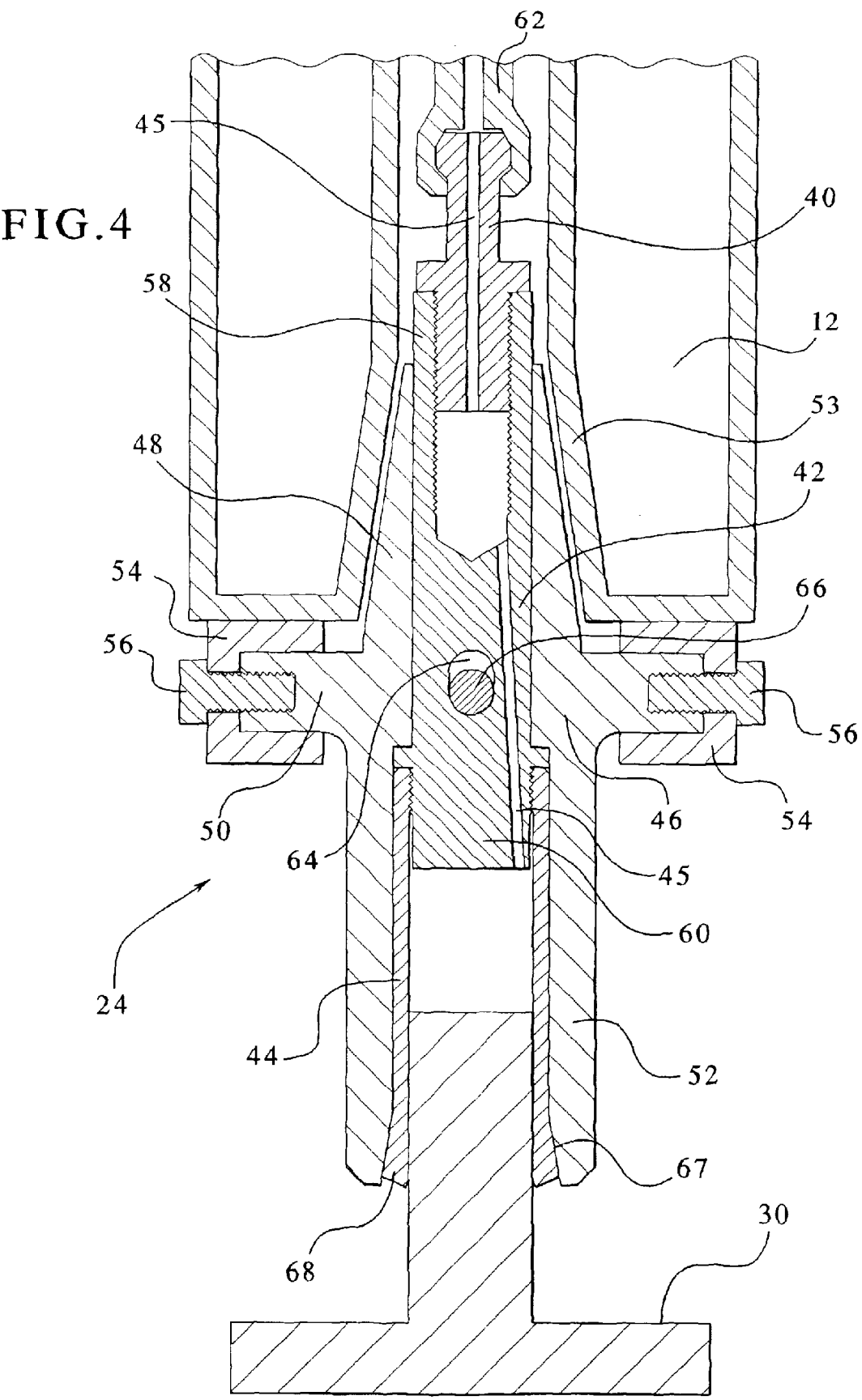
FIG. 4 is a cross-sectional view of the work piece and work piece holder shown in FIG. 3, wherein the work piece holder is grasping the work piece.

As shown in FIG. 2, the collet 44 includes a flared grasping end 68. The collet housing portion 52 of the adapter body 46 includes a tapered portion 67 that corresponds to the flared grasping end 68 of the collet 44. As shown in FIG. 2, the internal diameter of the flared grasping end 68 is slightly larger that the internal diameter of the remaining portion of the collet 44. However, when the flared grasping end 68 of the collet 44 is withdrawn into the tapered portion 67, as shown in FIG. 4, the internal diameter of the flared grasping end 68 is reduced to approximately the same diameter as the remaining portion of the collet 44, allowing the collet 44 to grasp the work piece 30 located within the collet 44. Similarly, when the flared grasping end 68 of the collet 44 translates out of the tapered portion 67 of the collet housing portion 52, the collet 44 springs back into an open position, as shown in FIG. 3, allowing the collet 44 to release the work piece 30 located within the collet 44.

As further shown in FIG. 2, the draw tube 42 includes an elongated slot 64. The elongated slot 64 aligns with an adapter bore (not shown) in the clamping portion 50 of the work piece holder 24 such that a retention pin 66 may be passed through the elongated slot 64 to hold the translating portion within the adapter body 46. The retention pin 66 acts as a retaining piece to secure the translating portion within the adapter body 46 such that the translating portion is allowed to translate along the axial bore of the adapter body 46 while preventing the translating portion from translating, or falling, completely out of the adapter body 46. In one embodiment of the work piece holder 24, the retention pin 66 may be held within the elongated slot 64 and the clamping portion 50 using screws to seal the adapter bore.

In the preferred embodiment shown in FIG. 2, the elongated diameter of the elongated slot 64 is approximately ⅛ of an inch larger than the diameter of the retention pin 66. The difference between the diameters of the elongated slot 64 and the retention pin 66 corresponds to the amount of travel required to actuate the collet 44 within the adapter body 46. Accordingly, the difference between the diameters of the elongated slot 64 and the retention pin 66 may be greater or smaller depending upon the length of travel required to actuate the collet 44 in a particular application. In the embodiment shown in FIGS. 2–3, the ⅛ of an inch travel allowed by the difference between the diameters of the elongated slot 64 and the retention pin 66 corresponds to approximately 0.015 of an inch reduction in the internal diameter of the flared grasping end 68 of the collet 44, which is sufficient for the collet 44 to grasp the work piece 30. Alternatively, the retaining piece may be formed from other and/or square keys in place of the retention pin 66 shown in FIGS. 2–3. Similarly, the elongated slot 64 may be otherwise geometrically formed to correspond to the particular retaining piece being used in order to control and limit the axial translation of the draw tube 42 within the adapter body 46.

Figure 5:
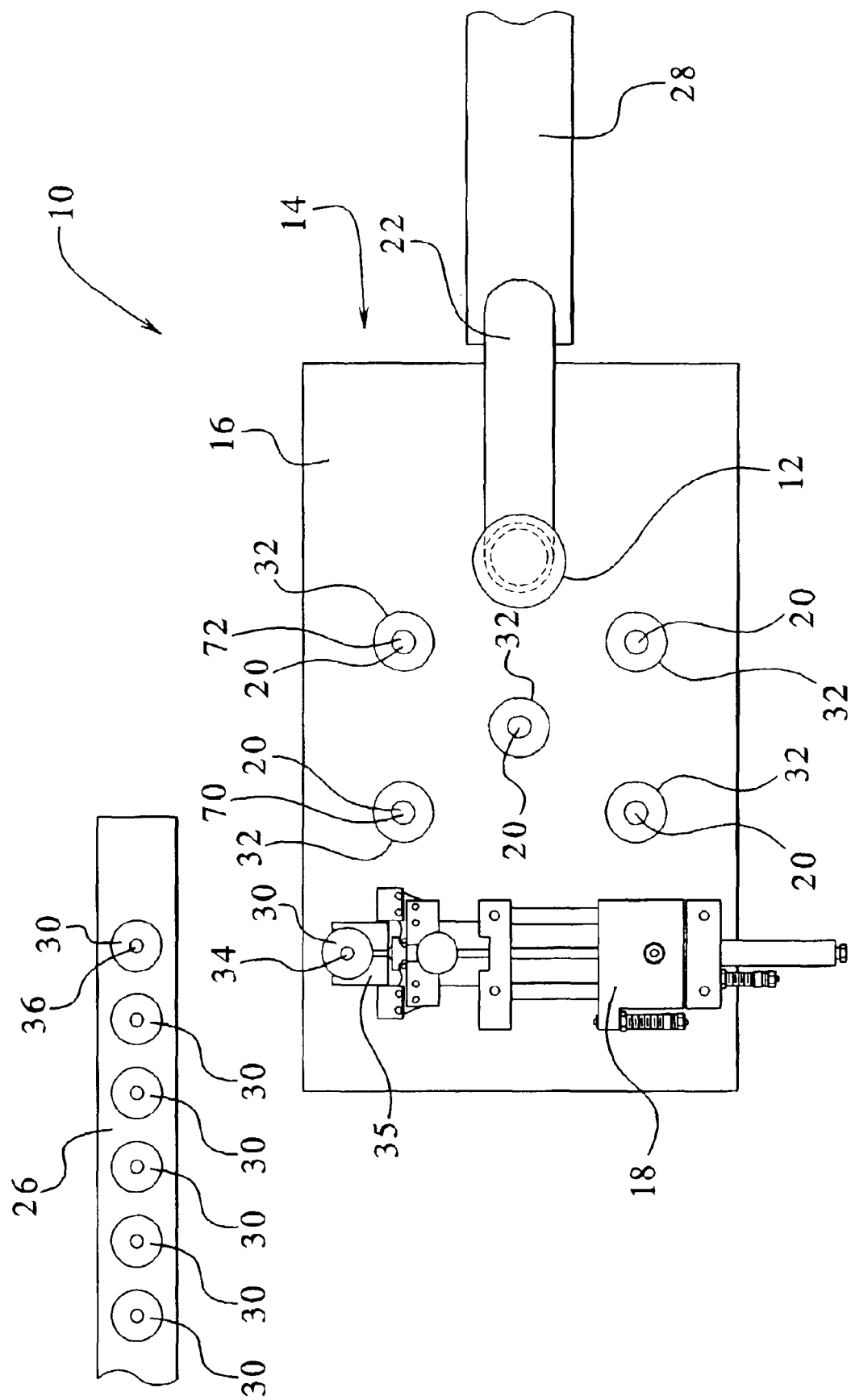
FIG. 5 is a top plan view of the milling machine shown in FIGS. 1A and 1B, wherein the work piece transfer device has placed a work piece on a work table.

FIG. 2 also illustrates a retention knob collet 62. The retention knob collet 62 is attached to a spindle drawbar (not shown) and is actuated by the movement of the drawbar. Thus, when the drawbar retracts into the spindle 12, the retention knob collet 62 closes and retracts into the spindle, as shown in FIG. 4. Similarly, when the drawbar advances from the spindle 12, the retention knob collet 62 opens and advances towards the work piece holder 24 as shown in FIGS. 4 and 5.

In the preferred embodiment of the present invention shown in FIGS. 2–3, the retention knob collet 62 is used to engage the retention knob 40, causing the draw tube 42 to translate within the adapter body 46 to actuate the collet 44. For example, as shown in FIG. 4, the retention knob collet 62 grasps the retention knob 40 and pulls the translating portion into the spindle 12 causing the collet 44 to withdraw into the adapter body 46 and grasp the work piece 30. Similarly, as shown in FIG. 3, the retention knob collet 62 may release the retention knob 40 and pushes against the top surface of the retention knob 40 causing the collet 44 to advance from the adapter body 46 and release the work piece 30. Additionally, the pressurized air directed through the vent hole 45 assists the release of the first work piece 34 from the collet 44 and assists in removing other unwanted material from the inner diameter of the collet 44. Thus, the collet 44 may be actuated by the retention knob collet 62 to grasp and release work pieces 30 as further described herein in reference to the method of the present invention.

It is further contemplated that as an alternative to using the collet 44 shown in FIGS. 2–3 for grasping the outer diameter of a work piece 30 as described above, a collet 44 may be used to grasp the work piece 30 along an inside diameter of the work piece 30. The criteria for selecting a collet 44 for grasping either the inner or outer diameter of the work piece 30 will be apparent to one skilled in the art and both types of collets 44 are well known in the art. Moreover, a drawbar actuated lathe chuck may be used in place of the retention knob 40, the draw tube 42, and the collet 44 shown in FIGS. 2–4. In an embodiment utilizing a drawbar actuated lathe chuck, the retention knob collet 62 engages a translating portion of the lathe chuck to actuate a set of jaws, the work piece engaging portion of the lathe chuck, for grasping the work piece 30. In yet another embodiment, the work piece 30 may be mounted manually within the spindle 12.

The method of the present invention is herein described with reference to the vertical milling machine 10 of the preferred embodiment shown in FIGS. 1A and 1B. However, it is contemplated that the method described herein is applicable to the use of other milling machines, such as, for example, a horizontal milling machine, as well as other work piece processing devices that utilize a spindle. Additionally, the methods of the present invention are applicable to multi-spindle machines, mills, drills, etc.

In the embodiment of the present invention illustrated in FIGS. 1A and 1B, unfinished work pieces 30 are brought to the milling machine 10 on the incoming conveyor 26, which, as shown in FIGS. 1A and 1B, may be a simple, linear conveyor. The work pieces 30 may be of any material, size and/or shape; however, the work pieces 30 shown FIGS. 1–9 are metal work pieces 30. The work pieces 30 are described herein as arriving at the milling machine 10 as unfinished work pieces 30. However, the work pieces 30 may arrive at the milling machine 10 in any form and the term unfinished is used herein in reference to the work pieces 30 not having been processed by the milling machine 10 of the present invention.

As shown in FIGS. 1A and 1B, a first 34 and a second 36 of the unfinished work pieces 30 are carried by the incoming conveyor 26 to a position adjacent to the machine table 14. The first and second work pieces 34, 36 do not differ from the remaining work pieces 30 and are designated "first" and "second" to facilitate an understanding of the progression of a work piece 30 through the vertical milling machine 10 of the preferred embodiment.

The work pieces 30 may be loaded onto the incoming conveyor 26 either manually or automatically. Further, the unfinished work pieces 30 may arrive at the milling machine 10 via the incoming conveyor 26 at predetermined intervals to enable the milling machine 10 to operate via automation. The operation of the incoming conveyor 26 may be timed to the operation of the milling machine 10 either manually or automatically. For example, proximity sensors (not shown) may be provided to automatically advance the incoming conveyor 26 each time a work piece 30 is removed from a predetermined location.

Although the incoming conveyor 26 shown in FIGS. 1A and 1B is a standard linear belt conveyor, the incoming conveyor 26 may be alternatively designed to hold, support, or position the work pieces 30. For example, the incoming conveyor 26 may be designed to orient the work pieces 30 to enable the work piece transfer device 18 to more easily grasp and transfer the work pieces 30 to the machine table 14 as described herein. The incoming conveyor 26 may further include guides (not shown) to regulate the spacing between each of the work pieces 30, enabling the incoming conveyor 26 to be accurately timed to the machining process. In one contemplated embodiment of the present invention, the incoming conveyor 26 includes supports designed to position the work pieces 30 to both facilitate the transfer of the work pieces 30 to the machine table 14, as well as, regulate the spacing of the incoming work pieces 30.

Moreover, the incoming conveyor may additionally include guides, barriers or other mechanisms designed to prevent the work pieces from unintentionally or accidentally being removed from the incoming conveyor 26. For example, a portion of each of the work pieces 30 may be located within a guide track (not shown) along the length of the incoming conveyor 26 such that the work pieces 30 may not be removed from the guide track. The guide track may further include an exit cavity through which the work pieces 30 may be removed from the incoming conveyor 26. Accordingly, when utilizing a guide track, the work pieces 30 could only be removed from the incoming conveyor 26 through the exit cavity at a predetermined position on the incoming conveyor 26, such as, for example, a position adjacent the machine table 14.

Turning now to FIG. 1A, when the first work piece 34 arrives at the position adjacent to the machine table 14, the work piece transfer device 18 extends from the machine table 14, activates to grasp the first work piece 34 from the incoming conveyor 26, moves the first work piece 34 from the incoming conveyor 26, and position the first work piece 34 above the machine table 14, as shown in FIG. 5. In the embodiment shown, the work piece transfer device 18 is an automated device formed using a pair of standard air cylinders configured to activate a set of effectors, or manipulators 35 for grasping the work pieces 30. However, the apparatus and method of the present invention may employ any automated work piece transfer device and its corresponding method of transfer, or alternatively, the work pieces 30 may be manually transferred to the machine table 14.

The work piece transfer device 18 shown in FIGS. 1A and 1B is designed to position each work piece 30 in a specific orientation at a specific location on the machine table 14 to enable the work pieces 30 to be grasped by the work piece holder 24 as discussed below, and enable the entire machining process to be performed using automated functions. As illustrated with reference to FIGS. 2 and 3, after the work piece transfer device 18 has removed the first work piece 34 from the incoming conveyor 26, the work piece transfer device 18 positions the first work piece 34 above a work piece pad 38. The work piece pad 38 may be provided on the fixture block 16 to assist the transfer of the work pieces 30 from the machine table 14 to the work piece holder 24 as describe below. Alternatively, the work piece transfer device 18 may transfer the work pieces 30 directly to the machine table 14. For example, the top surface of the work table 14 may be approximately on plane with the top surface of the incoming conveyor 26, to enable the work piece transfer device 18 to transfer the work pieces 30 from the incoming conveyor 26 directly to the work piece pad 38 by moving the work pieces 30 only along the y axis. In another alternative embodiment, the work piece holder 24 may grasp the work piece 30 directly from the work piece transfer device 18.

Figure 6:
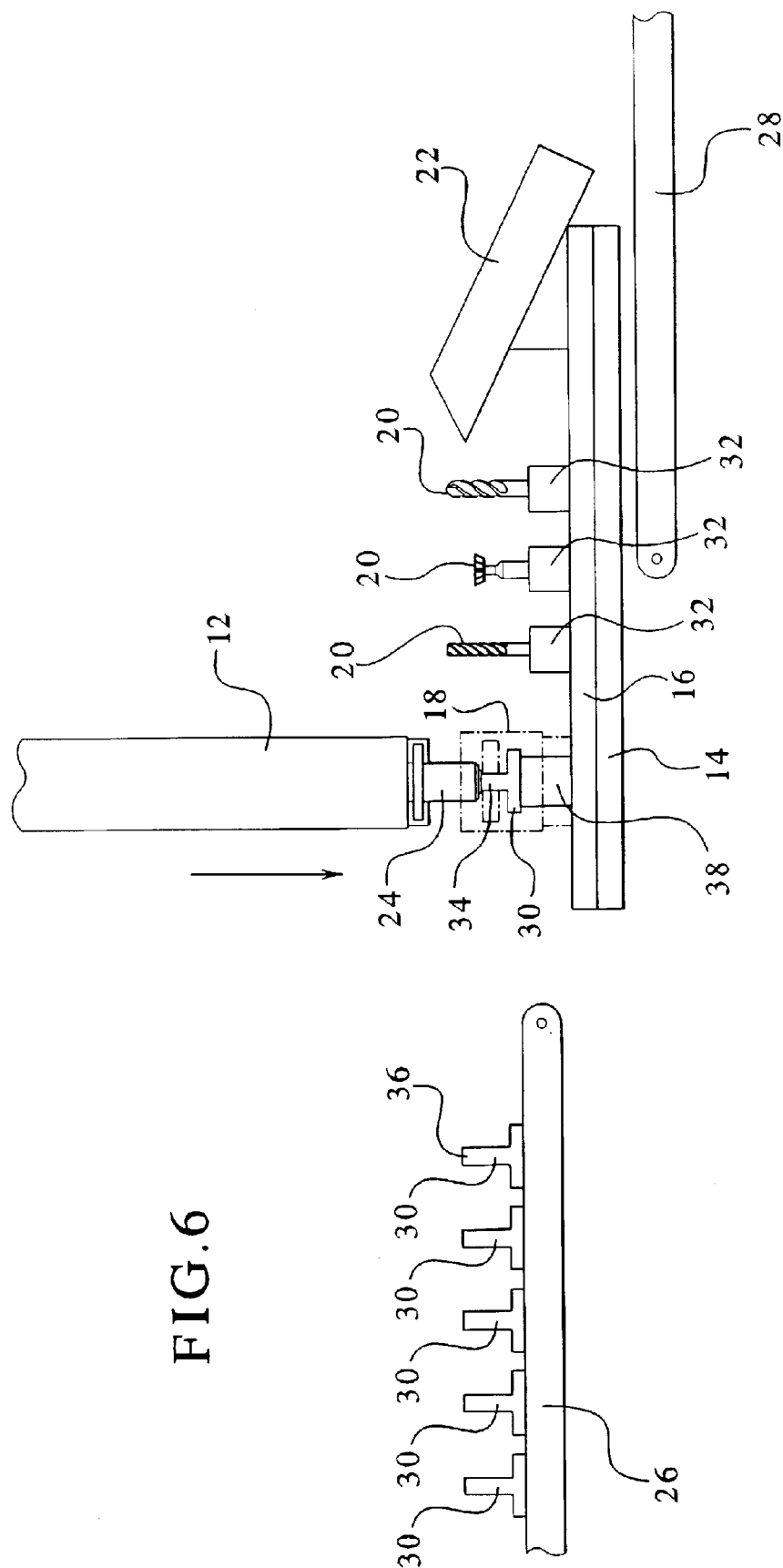
FIG. 6 is a side view of the milling machine shown in FIGS. 1A and 1B, wherein a work piece holder is grasping the work piece on the work table.

After the first work piece 34 has been removed from the incoming conveyor 26, and preferably positioned above the work piece pad 38, the milling machine 10 adjusts the machine table 14 and the spindle 12 such that first work piece 34 may be locate within the work piece holder 24, as shown in FIG. 6. The work piece pad 38 functions as a positive stop to enable the work piece 30 to be properly positioned within the work piece holder 24. For example, the work piece pad 38 can be used to ensure that each of the work pieces 30 is inserted into the collet 44 a predetermined consistent distance.

Once the portion of the first work piece 34 to be grasped by the spindle 12 is located within the collet 44 of the work piece holder 24, as shown in FIG. 3, the drawbar is activated, causing the retention knob collet 62 to grasp the retention knob 40, pulling the collet 44 into the adapter body 46 and grasping the first work piece 34, as shown in FIG. 4. In the position shown in FIG. 4, the work piece 30 is secured within the work piece holder 24 by a band of contact between the collet 44 and the work piece 30 of at least approximately ½–¾ of an inch. The collet 44 does not contact the work piece 30 along the entire length of the collet 44 because the internal diameter of the collet 44 is slightly larger in than the diameter of the inserted portion of the work piece 30. The slightly larger collet 44 is used to allow the work piece 30 to be inserted an adequate depth into the collet 44. Consequently, the collet 44 shown in FIG. 4 is overcrimped such that the internal diameter of the flared grasping end 68 of the collet 44 is smaller than the remaining portion of the collet 44 to ensure sufficient contact along a portion of the work piece 30.

After the first work piece 34 is secured within the work piece holder 24, the spindle 12 may then lift the first work piece 34 off the work piece pad 38 and spin the first work piece 34. The machine table 14 may then perform a series of predetermined movements along the x and y axes in coordination with spindle 12 movements along the z axis to cause the unfinished first work piece 34 to be machined to finished form by each of the machine tools 20 as described below. By ensuring the alignment of the work pieces 30 is consistent each time a work piece 30 is grasped by the work piece holder 24, the orientation of the spindle 12 can be monitored and used to ensure the processing of the work piece 30 is carried out along the proper surfaces of the work piece 30.

As shown in FIGS. 1A and 1B, the fixture block 16 mounts to the machine table 14 of the milling machine 10 and is designed to hold machining tools 20 in a configuration for efficiently producing finished work pieces 30. For example, the unfinished work pieces 30 shown in FIGS. 1A and 1B require interaction with the five illustrated machining tools 20 before leaving the milling machine 10 along the outgoing conveyor 28 as finished work pieces 30. Greater or fewer machining tools 20 may be employed as required by the number of machining operations required for a particular type of work piece 30.

In the depicted embodiment, the fixture block 16 includes five holders 32 for fixing the five depicted work tools 20 to the fixture block 16. The holders 32 may be any holder capable of affixing work tools 20 to the fixture block 16. Examples of suitable holders 32 include collets, square tool holders, lathe tool post holders, Weldon holders, Morse taper holders, and/or Jacobs chucks. It is further contemplated that the holders 32 may be specifically adapted for affixing particular work tools 20 to the fixture block 16. The work tools 20 may be positioned on the fixture block 16 in a pattern that maximizes the efficiency of the automated milling process. It is recognized that the number and type of the machining tools 20, as well as the pattern of the holders 32, will vary depending on the requirements of the particular work pieces 30 to be machined.

The unfinished work pieces 30 require interaction with the work tools 20 before they are transferred from the work table 14 as finished work pieces 30. Different types of work pieces 30 require different milling operations to be completed and each of the milling operations requires the use of a specific machining tool 20. Accordingly, the milling machine 10 of the preferred embodiment of the present invention can be setup to include each of the machining tools 20 required to manufacture a given type of work piece 30 mounted to the fixture block 16 to enable the milling machine 10 to be automated to efficiently produce finished work pieces 30 as described herein. Accordingly, the work tools 20 may be milling tools for removing metal from the work pieces 30. Alternatively, the work tools 20 may be for surface finishing tools, lathing tools, probe tools, or any other type of work tool 30 used to process a work piece 30. For example, work tools 20 may be provided for drilling, counterboring, back-counterboring, chamfering, threading, rounding, filleting, grinding, turning, burnishing, stamping, marking, engraving, and/or probing, as well as any number of other processing operations. Further, it is contemplated that live work tools 20 powered by electricity, pneumatic air, or hydraulic power may be mounted to the fixture block 16 to perform cross-drilling, grinding, milling of flats or other operations that require a live work tool 20.

Figure 7:
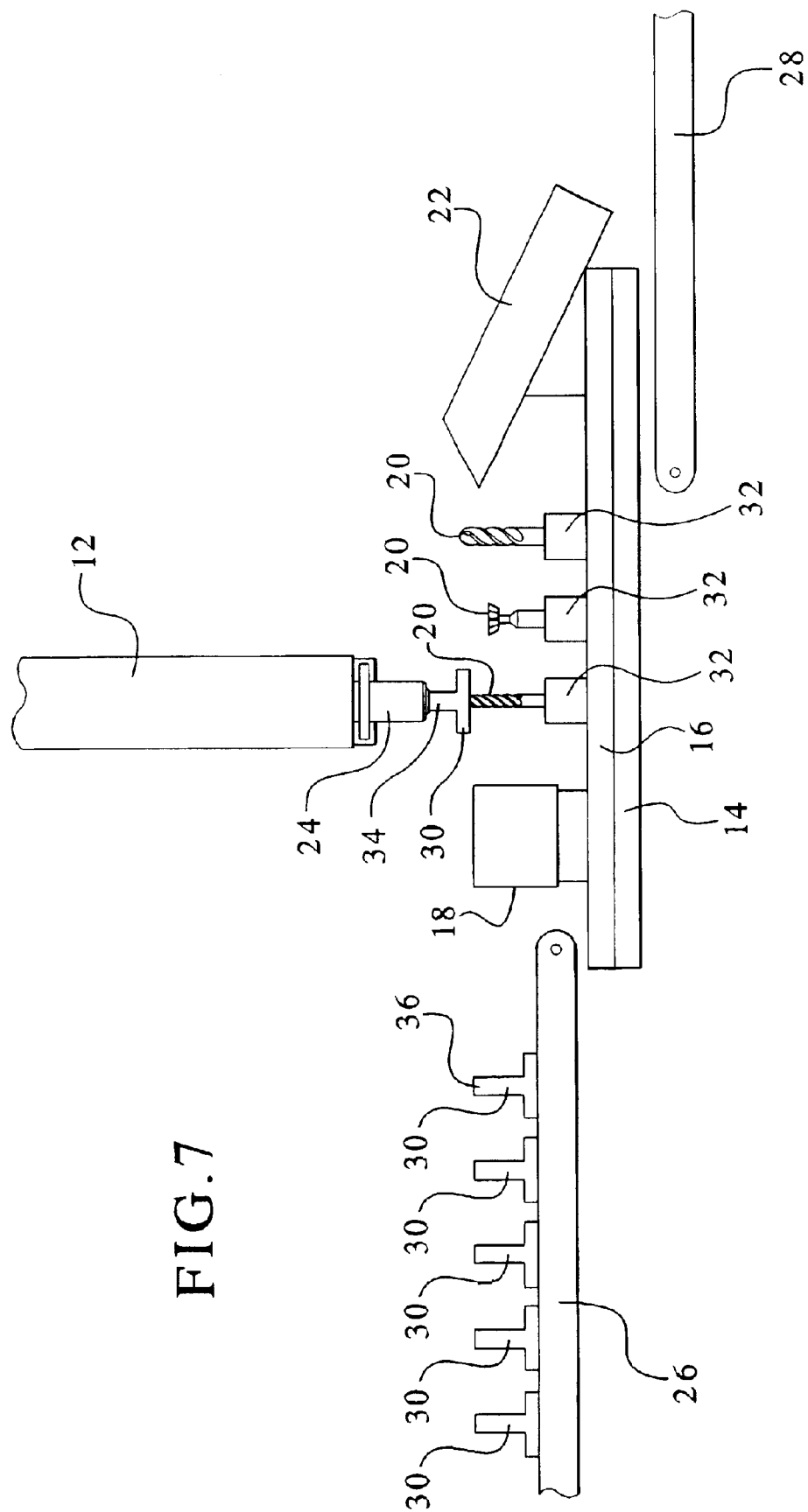
FIG. 7 is a side view of the milling machine shown in FIGS. 1A and 1B, wherein the work piece is brought into contact with a first machining tool.

Turning now to FIG. 7, after the work piece holder 24 has grasped the first work piece 34, the machine table 14 moves a first work tool 70 into position under the spindle 12. The first work tool 70 is held in place on the fixture block 16 while the spindle 12 brings the rotating first work piece 34 into contact with the first work tool 70. The vertical movement of the spindle 12 and the horizontal movements of the machine table 14 control the machining procedure performed by the first work tool 70. It should be noted that the vertical alignment of the work piece 30 allows gravity to evacuate the chips of metal removed from the surfaces and cavities of the work piece 30. After the first work tool 70 has performed its function, the spindle 12 raises above the machine table 14, disengaging the first work piece 34 from the first work tool 70.

Figure 8:
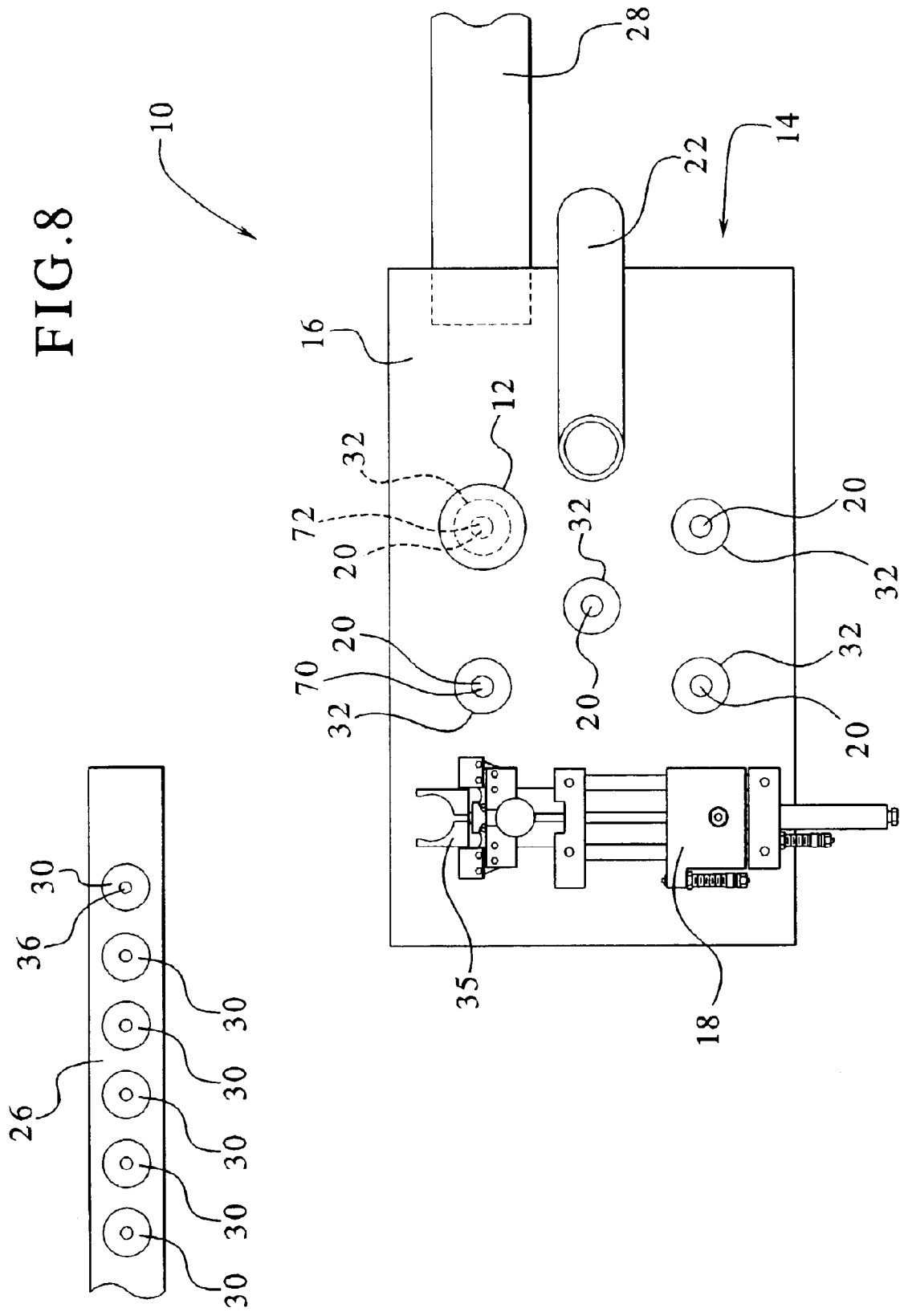
FIG. 8 is a top plan view of milling machine shown in FIGS. 1A and 1B, wherein the work piece is brought into contact with a second machining tool.

Turning now to FIG. 8, the machine table 14 then moves a second work tool 72 into position under the spindle 12. The second work tool 72 is held in place on the fixture block 16 while the spindle 12 brings the rotating first work piece 34 into contact with the second work tool 72. The vertical movement of the spindle 12 and the horizontal movements of the machine table 14 control the machining procedure performed by the second work tool 72. After the second work tool 72 has performed its function, the spindle 12 raises above the machine table 14, disengaging the first work piece 34 from the second work tool 72. The machine table 14 and the spindle 12 continue their coordinated movements until the first work piece 34 has completed the processing operations to be performed by the work tools 20 mounted to the fixture block 16.

Figure 9:
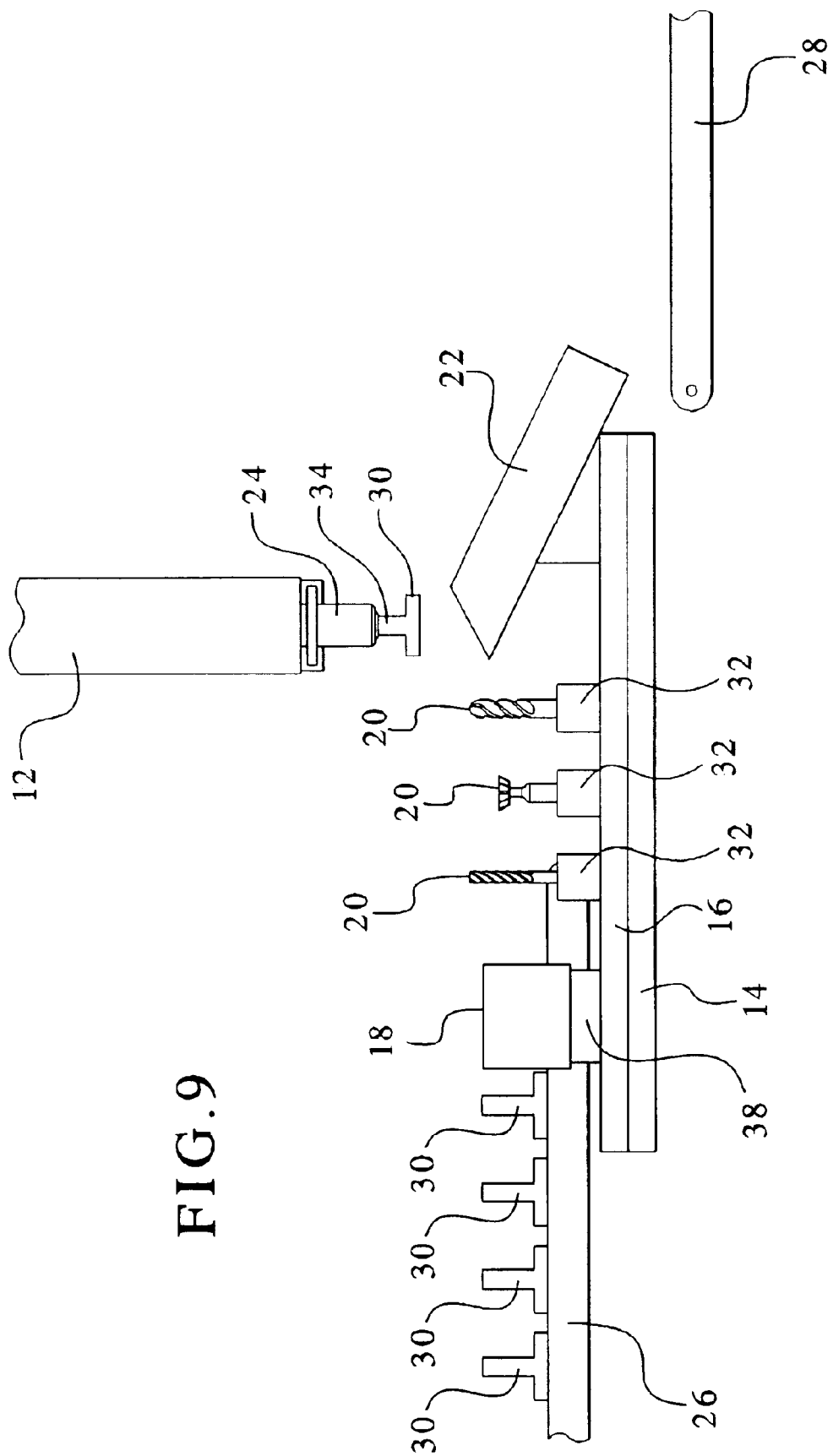
FIG. 9 is a side view of milling machine shown in FIGS. 1A and 1B, wherein the work piece holder is positioned to release the work piece into an exit tube.

Turning now to FIG. 9, after the first work piece 34 has completed its interaction with each of the work tools 20, the machine table 14 positions the exit tube 26 below the spindle 12. After the spindle is positioned above the exit tube, the retention knob collet 62 advances within the work piece holder 24 and releases the retention knob 40 while pushing against the top surface of the retention knob 40 causing the collet 44 to advance from the adapter body 46 thereby releasing the finished first work piece 34 through the exit tube 26 onto the outgoing conveyor 28. As described above with reference to FIG. 3, the pressurized air directed through the vent hole 45 assists the release of the first work piece 34 from the collet 44.

As the first work piece 34 is being released from the work piece holder 24, the work piece transfer device 18 is transferring a second work piece 36 from the incoming conveyor 26 to the machine table 14 as-described above with respect to the first work piece 34. Thus, after the first work piece 34 has been released by the work piece holder 24, the second work piece 36 is in position on the work piece pad 38 and the machine table 14 then moves the second work piece 36 under the spindle 12 and the spindle 12 grasps the second work piece 36 to be machined as described with respect to the first work piece 34 above.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended

I claim:

1. A work piece holder comprising:
   an adapter body having an axial bore;
   a translating portion located within said axial bore of said adapter body, said translating portion having a proximal end for coupling with a retention knob collet and a distal end for attaching to a collet; and
   a retaining piece coupled to said adapter body and to said translating portion, said retaining piece allowing said translating portion to translate along the axis of said adapter body.

2. The work piece holder of claim 1, further comprising a collet attached to said distal end of said translating portion.

3. The work piece holder of claim 1, wherein said translating portion further comprises a retention knob and a draw tube.

4. The work piece holder of claim 1, wherein said retaining piece is a retaining pin.

5. The work piece holder of claim 4, wherein said retaining pin secures said translating portion within said adapter body via an elongated slot located in said translating portion, said elongated slot having an elongated diameter.

6. The work piece holder of claim 5 wherein the elongated diameter of said elongated slot is approximately ⅛ of an inch greater than the diameter of said retaining pin.

7. The work piece holder of claim 1, wherein said translating portion includes a vent hole.

8. A machining apparatus having a machine table, which moves along a first and second axis located in a plane, and a rotating spindle having a spindle, which moves along a third axis perpendicular to the plane, comprising:
   a fixture block coupled to the machine table; and
   a work piece holder coupled to the spindle, wherein said work piece holder utilizes the spindle drawbar to actuate a work piece engaging portion.

9. The machining apparatus of claim 8, wherein the machining apparatus is a vertical milling machine.

10. The machining apparatus of claim 8, wherein said fixture block includes holders for securing processing tools to said fixture block.

11. The machining apparatus of claim 8, wherein said fixture block includes a work piece transfer device attached to said fixture block.

12. The machining apparatus of claim 8, wherein said translating portion includes a vent hole.

13. The machining apparatus of claim 8, wherein said fixture block includes a work piece pad.

14. The machining apparatus of claim 8, further comprising an incoming conveyor located adjacent to a first side of the work table and an outgoing conveyor located adjacent to a second side of the work table.

15. A method of machining a work piece on a machining apparatus having a machine table and a spindle comprising the steps of:
   coupling a work piece holder to the spindle;
   coupling a fixture block to the machine table, said fixture block having a machining tool secured thereto;
   providing a work piece;
   mounting said work piece to said work piece holder;
   rotating said work piece; and
   bringing said rotating work piece into contact with said machining tool.

16. The method of claim 15, wherein said fixture block includes a work piece transfer device attached to said fixture block.

17. The method of claim 15, wherein said fixture block includes a work piece pad.

18. A work piece holder comprising:
   a spindle;
   an adapter body having an axial bore;
   a translating portion located within and translatable relative to said axial bore of said adapter body, said translating portion having a proximal end for coupling with a retention knob collet of the spindle and a distal end for attaching to a collet; and
   a retaining piece coupled to said adapter body and to said translating portion, said retaining piece allowing said translating portion to translate along the axis of said adapter body.

19. The work piece holder of claim 18, further comprising the collet attached to said distal end of said translating portion.

20. The work piece holder of claim 18, wherein said translating portion includes a retention knob and a draw tube.

21. The work piece holder of claim 18, wherein said retaining piece is a retaining pin.

22. The work piece holder of claim 21, wherein said retaining pin secures said translating portion within said adapter body via an elongated slot located in said translating portion, said elongated slot having an elongated diameter.

23. The work piece holder of claim 22 wherein the elongated diameter of said elongated slot is approximately ⅛ of an inch greater than the diameter of said retaining pin.

24. The work piece holder of claim 18, wherein said translating portion includes a vent hole.

* * * * *